US008166256B2

(12) United States Patent
Mealey et al.

(10) Patent No.: US 8,166,256 B2
(45) Date of Patent: Apr. 24, 2012

(54) USING A DUAL MODE READER WRITER LOCK

(75) Inventors: Bruce Mealey, Austin, TX (US); James Bernard Moody, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 12/723,714

(22) Filed: Mar. 15, 2010

(65) Prior Publication Data
US 2011/0225335 A1 Sep. 15, 2011

(51) Int. Cl.
*G06F 12/16* (2006.01)
(52) U.S. Cl. ........ 711/152; 711/164; 711/167; 710/200; 380/264
(58) Field of Classification Search .................. 711/152, 711/164, 167; 710/200; 380/264
See application file for complete search history.

(56) References Cited

U.S. PATENT DOCUMENTS

| | | | | |
|---|---|---|---|---|
| 6,088,799 | A * | 7/2000 | Morgan et al. ................. | 713/182 |
| 6,546,443 | B1 | 4/2003 | Kakivaya et al. | |
| 6,823,511 | B1 | 11/2004 | McKenney et al. | |
| 2004/0268074 | A1* | 12/2004 | Yagi .............................. | 711/164 |
| 2005/0010590 | A1* | 1/2005 | Blaicher ........................ | 707/102 |
| 2006/0230411 | A1 | 10/2006 | Richter et al. | |
| 2007/0165864 | A1* | 7/2007 | Nagase et al. ................. | 380/284 |
| 2007/0239915 | A1 | 10/2007 | Saha et al. | |

OTHER PUBLICATIONS

IBM-: Method for Automatically Switching Between Read and Write (Shared and Exclusive) Locks on a Resource While Guaranteeing Deadlock Avoidance: IP.COM/IBM TDB, Oct. 8, 2008.
Holm-et al.; "Adaptive Lock Escalation/De-escalation"; IP.COM/IBM TDB: Jan. 1, 1992.
Hossain-et al.: "Improving Support for Locality and Fine-Grain Sharing in Chip Multiprocessors"; ACM Digital Library: pp. 155-165, Oct. 2008.
Baugh-et al.: "Using Hardware Memory Protection to Build a High-Performance. Strongly-Atomic Hybrid Transactional Memory": ACM/IEEE, pp. 115-125. 2008.

* cited by examiner

*Primary Examiner* — Jae Yu
(74) *Attorney, Agent, or Firm* — Garg Law Firm, PLLC; Rakesh Garg; Libby Z. Toub

(57) ABSTRACT

A method, system, and computer usable program product for using a dual mode reader writer lock. A contention condition is detected in the use of a lock in a data processing system, the lock being used for managing read and write access to a resource in the data processing system. A determination of the data structure used for implementing the lock is made. If the data structure is a data structure of a reader writer lock (RWL), the data structure is transitioned to a second data structure suitable for implementing the DML. A determination is made whether the DML has been expanded. If the DML is not expanded, the DML is expanded such that the data structure includes an original lock and a set of expanded locks. The original lock and each expanded lock in the set of expanded locks forms an element of the DML.

32 Claims, 12 Drawing Sheets

USING A DUAL MODE READER WRITER LOCK

RELATED APPLICATIONS

The present invention is related to similar subject matter of co-pending and commonly assigned U.S. patent application Ser. No. 12/723,717 entitled "DUAL MODE READER WRITER LOCK," filed on Mar. 15, 2010, and U.S. patent application Ser. No. 12/723,719 entitled "RETOOLING LOCK INTERFACES FOR USING A DUAL MODE READER WRITER LOCK," filed on Mar. 15, 2010, which are hereby incorporated by reference.

BACKGROUND OF THE INVENTION

1. Field of the Invention

The present invention relates generally to an improved data processing system, and in particular, to a computer implemented method for improving the reading and writing of data. Still more particularly, the present invention relates to a computer implemented method, system, and computer usable program code for using a dual mode reader writer lock (DML).

2. Description of the Related Art

Processes executing in a data processing system read and write data associated with a variety of resources. A data file, a memory location, and an address on a disk are some examples of such a resource.

When a process executing in a data processing system has to read or write data from or to a resource, the operating system has to sequence and control the read/write requests. This control is important in ensuring that read and write requests for the same resource by multiple processes do not compromise the integrity of the data of that resource. For example, a process should not be allowed to read data while another process is writing that data. Multiple processes may be allowed to read the same data simultaneously but not in conjunction with one or more processes attempting to write that data.

To implement these and other rules for reading and writing data, operating systems implement locks. A read write lock is a data structure whose data has to be set or reset, or incremented or decremented before a process can read or write the data of an associated resource. Such a lock is also known as a reader writer lock (RWL) or a complex lock.

Setting or incrementing a RWL is called acquiring or getting a lock. Resetting or decrementing a RWL is called releasing or freeing a lock. A reader lock or a read lock is a state of a RWL that permits a process or thread to read the resource associated with the RWL. Multiple processes or threads can concurrently acquire a read lock on a common resource. A writer lock or a write lock is a state of a RWL that permits a thread to write data to the resource associated with the RWL. Only a single thread can acquire a single write lock on the resource at any given time, and no thread can hold or acquire a read lock while another thread holds a write lock on the resource.

Typically, a RWL is implemented using a single data word. A data word is a specific number of bits that are handled together in the architecture of an operating system. In one case, the size of a data word may be the number of bits that can be held in a single register in a particular processor of the data processing system. In another case, the data word size may be the minimum number of bits can be transferred from a given memory to a given processor. Commonly available operating systems have implemented data word sizes of sixteen, thirty two, sixty four, and one hundred and twenty eight bits. A data word may be of any size suitable for a particular implementation.

When an operating system manipulates a RWL, that manipulation must not be interrupted for the integrity of the lock. In other words, all the instructions for setting or resetting, or incrementing or decrementing a RWL must be executed from start to finish without being interrupted or preempted by another process. An operation whose set of instructions must be executed in this manner is called an atomic operation. Manipulation of a RWL is an atomic operation. Acquiring a lock and releasing a lock are examples of lock manipulations performed as atomic operations.

At any given time during the operation of a data processing system, several processes or threads may wish to acquire a lock for a common resource in close temporal proximity of one another. Several other processes or threads that have already acquired the lock may wish to release the lock at or near the same time. Some processes or threads wishing to acquire or release the lock may deal with read locks on the resource, while others may deal with write locks.

SUMMARY OF THE INVENTION

The illustrative embodiments provide a method, system, and computer usable program product for using a dual mode reader writer lock (DML). An embodiment of the invention detects a contention condition in the use of a lock in a data processing system, the lock being used for managing read and write access to a resource in the data processing system. The embodiment determines a data structure used for implementing the lock. The embodiment, in response to the data structure being a data structure of a reader writer lock (RWL), transitions the data structure to a second data structure suitable for implementing the DML. The embodiment determines whether the DML has been expanded. In response to the DML not having been expanded, the embodiment expands the DML such that the data structure includes an original lock and a set of expanded locks. The original lock and each expanded lock in the set of expanded locks forms an element of the DML.

Another embodiment further sets an interlock indicator in the DML to a first value. The embodiment sets an expanded indicator in the DML to a second value corresponding to the expanded state of the DML. The embodiment sets an upgraded indicator in the DML to a third value indicating that the DML is using the set of expanded locks.

Another embodiment further receives a request from a process in the data processing system to perform an operation using the DML. The embodiment determines whether to switch a mode of operation of the DML from a first mode to a second mode, the first mode of operation of the DML using the original lock of the DML, and the second mode of operation of the DML using the original lock and a subset of the expanded locks. The embodiment switches the mode of operation of the DML to the second mode responsive to a determination to switch to the second mode. The embodiment assigns the process to one of the elements of the DML, the one of the elements forming an assigned element.

In another embodiment, the process is a thread of a second process.

Another embodiment further determines, in response to the request being for manipulating a read lock, whether the request is for acquiring the releasing the read lock. The embodiment determines, forming a second determination, responsive to the request being for releasing the read lock, whether the assigned element is holding zero read locks, whether the DML has been downgraded, or both. The embodiment reassigns the process to a second element in the DML responsive to the second determination being true.

Another embodiment further prepares to perform an acquisition of a read lock using the DML. The embodiment determines whether a read-mode indicator is set to a fourth value in an element of the DML. The embodiment sets an interlock indicator in the DML to a first value responsive to the read-mode indicator not being set to the third value. The embodiment sets the read-mode indicator to the fourth value after setting the interlock indicator to the first value. The embodiment acquires the read lock using one of the elements of the DML.

Another embodiment further resets the interlock indicator.

Another embodiment further prepares to perform a release of a read lock using the DML. The embodiment determines whether a read-mode indicator is set to a fourth value in an element of the DML. The embodiment sets an interlock indicator in the DML to a first value responsive to the read-mode indicator not being set to the fourth value. The embodiment sets the read-mode indicator to the fourth value after setting the interlock indicator to the first value. The embodiment determines, forming a third determination, whether a lock count of the DML will reduce to zero if the read lock is released. The embodiment releases the read lock using one of the elements of the DML. The embodiment reset the read-mode indicator, responsive to the third determination being true.

Another embodiment further downgrades the DML such that the DML operates in a first mode of operation, the first mode of operation of the DML using the original lock of the DML, and a second mode of operation of the DML using the original lock and a subset of the expanded locks.

In another embodiment, the DML operating in the first mode remains expanded.

Another embodiment further wakes up a third process, the third process being in a waiting state, the third process having requested an operation with respect to a write lock on the resource. The embodiment grants the write lock on the resource to the third process.

Another embodiment further receives a request to acquire a read lock while using the DML that has been unexpanded, downgraded, or a combination thereof. The embodiment causes the request to wait responsive to an interlock indicator being set to a first value. The embodiment performs the acquisition of the read lock according to the request when the interlock indicator has been reset.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
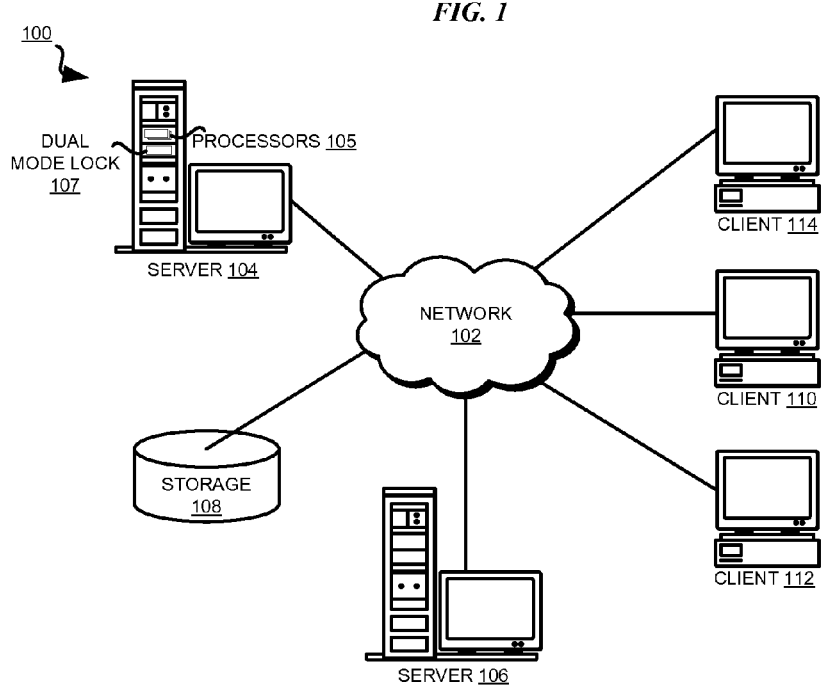
FIG. 1 depicts a pictorial representation of a network of data processing systems in which illustrative embodiments may be implemented.

Under certain circumstances, several atomic operations for each request to acquire or release a lock from several processes or threads may be pending in a data processing system. The invention recognizes that inundating the data processing system with several atomic operations for a RWL can adversely affect the performance of the data processing system.

For the clarity of the description, "process" is used to mean a process or a thread of a process. An operation with respect to a process is similarly applicable to a thread, and an operation with respect to a thread is similarly applicable to a process within the scope of the invention.

The invention further recognizes that under certain other circumstances, the data structure of the lock may be saturated and may not be able to accommodate any more lock requests. For example, a data word of hypothetical size of two bits will be saturated if four threads are already holding read locks on the associated resource because two bits can be used to count only from 0 to 4. A fifth thread requesting a read lock cannot be accommodated until one of the other four processes holding a read lock releases its read lock. The invention recognizes that a backlog of atomic operations waiting to execute on a RWL in a data processing system can also adversely affect the performance of the data processing system.

These circumstances are example scenarios where contention for RWLs arises in a data processing system. The invention recognizes that a contention for RWL is likely in a data processing system when the number of processes or threads contending for a RWL increase beyond a threshold number. The invention further recognizes that as the number of processors in a data processing system increase, such as in a multiprocessor data processing system or logical partition, the number of processes and threads also rises leading to the RWL contentions.

The illustrative embodiments used to describe the invention generally address and solve the above-described problems and other problems related to RWLs. The illustrative embodiments provide a method, computer usable program product, and data processing system for using a dual mode reader writer lock.

An embodiment of the invention may enable the data processing system to process atomic operations for a RWL with a reduced affect on the system performance as compared to the presently configured data processing system when the number of atomic operations reaches a threshold number. For example, for the same number of atomic operations performed for a single RWL, a data processing system implementing an embodiment of the invention may demonstrate better system performance as compared to a data processing system without the embodiment.

An embodiment of the invention may also allow more processes and threads to acquire and release locks concurrently with a diminished adverse affect on the system performance as compared to a presently configured data processing system. For example, for the same system performance, a data processing system employing an embodiment of the invention may allow more processes to acquire read locks on a resource as compared to a data processing system without the embodiment.

The illustrative embodiments are described with respect to data, data structures, indicators, and identifiers only as examples. Such descriptions are not intended to be limiting on the invention. For example, an illustrative embodiment described with respect to 64 bit data word may be implemented using a 128 bit data word in a similar manner within the scope of the invention.

Furthermore, the illustrative embodiments may be implemented with respect to any type of data processing system. For example, an illustrative embodiment described with respect to a multiprocessor standalone data processing system may be implemented in a multiprocessor logical partition system within the scope of the invention.

The illustrative embodiments are further described with respect to certain parameters, attributes, and configurations only as examples. Such descriptions are not intended to be limiting on the invention. An embodiment of the invention may be implemented with respect to any type of data processing system, such as, for example, any type of client system, server system, platform, or a combination thereof.

An application implementing an embodiment may take the form of data objects, code objects, encapsulated instructions, application fragments, services, and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
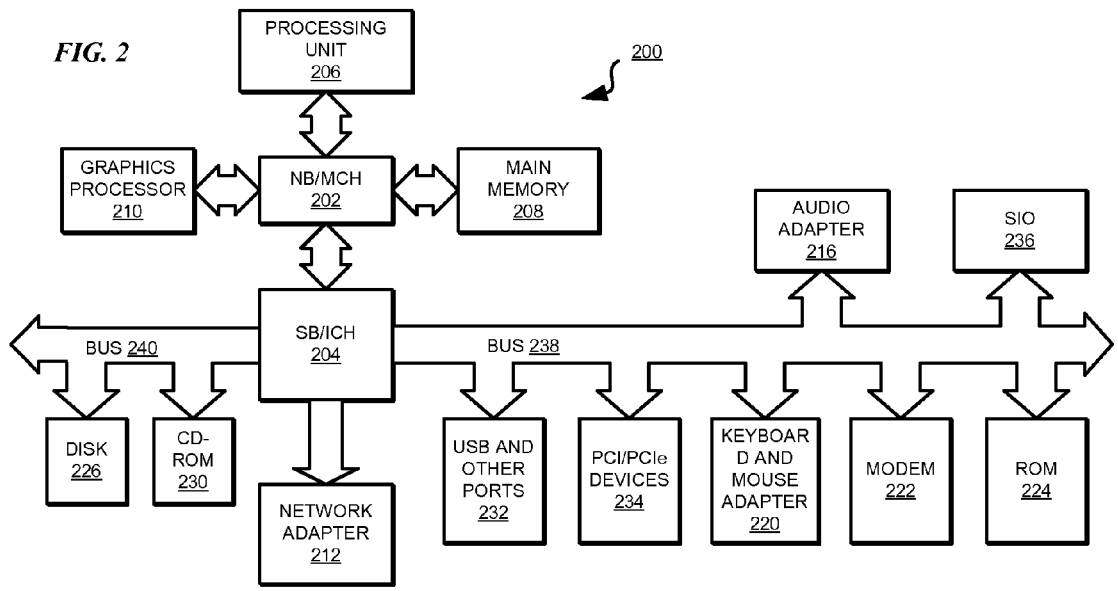
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Server 104 may include multiple processors 105. Other depicted data processing systems may also include more than one processor in a similar manner (not shown). Server 104 may further include DML 107. DML 107 may be a DML according to an embodiment of the invention. DML 107 may be implemented in server 104 in conjunction with other RWLs without limitation. Furthermore, DML 107 may be configured in a data processing system other than server 104, such as in server 106, and may be accessible to server 104 over network 102.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc., in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
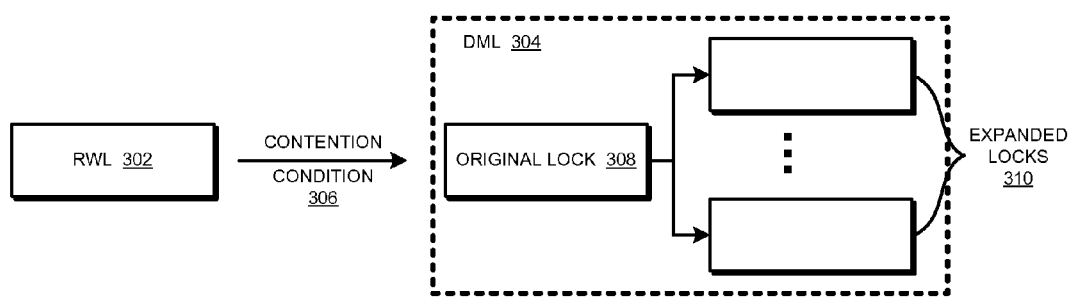
FIG. 3 depicts a block diagram of transitioning from a RWL to a DML in accordance with an illustrative embodiment.

With reference to FIG. 3, this figure depicts a block diagram of transitioning from a RWL to a DML in accordance with an illustrative embodiment. RWL 302 may be a RWL as is presently used for implementing locks. DML 304 may be a DML, such as DML 107 in FIG. 1 or a DML as described according to an embodiment elsewhere in this disclosure.

A contention condition may arise while RWL 302 is being used to hold locks on a certain resource in a data processing system. Contention condition 306 is one such contention condition and may be any condition designated as a contention condition in a given implementation.

Experiencing contention condition 306 causes RWL 302 to be transformed or transitioned into DML 304. DML 304 includes original lock 308 and any number of expanded locks 310. As described with respect to an embodiment elsewhere, each of expanded locks 310 is indexed within original lock 308 and can be referenced using such an index.

Figure 4:
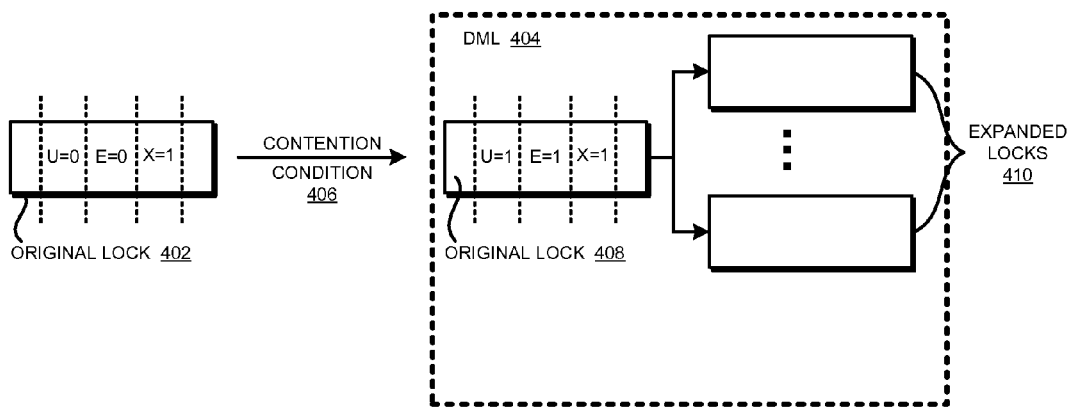
FIG. 4 depicts a block diagram of transitioning from a modified RWL to a DML in accordance with an illustrative embodiment.

With reference to FIG. 4, this figure depicts a block diagram of transitioning from a modified RWL to a DML in accordance with an illustrative embodiment. A presently used RWL may be modified into original lock 402 as can be used in a DML according to an embodiment. DML 404 may be similar to DML 304 in FIG. 3. RWL 302 in FIG. 3 or a modified RWL in the form of original lock 402 is also called a legacy lock.

Contention condition 406 may be similar to contention condition 306 in FIG. 3. Contention condition 406 may arise while original lock 402 is being used to hold locks on a certain resource in a data processing system.

Experiencing contention condition 406 causes original lock 402 to be transformed into DML 404. DML 404 includes original lock 408 and any number of expanded locks 410.

Original lock 408 may be the same as original lock 402 but configured to be used not as a presently used RWL but DML 404. For example, in one embodiment, a combination of the upgraded indicator, the expanded indicator, and expandable indicator of original lock 402 may be set, turned on, or made to hold a particular value to transform or transition original lock 402 into original lock 408. In one example implementation of DML 404, the upgraded, expanded, and expandable indicators may each be a single bit in the lock word of original lock 408, and may be set to 1 to transform original lock 402 into original lock 408.

Figure 5:
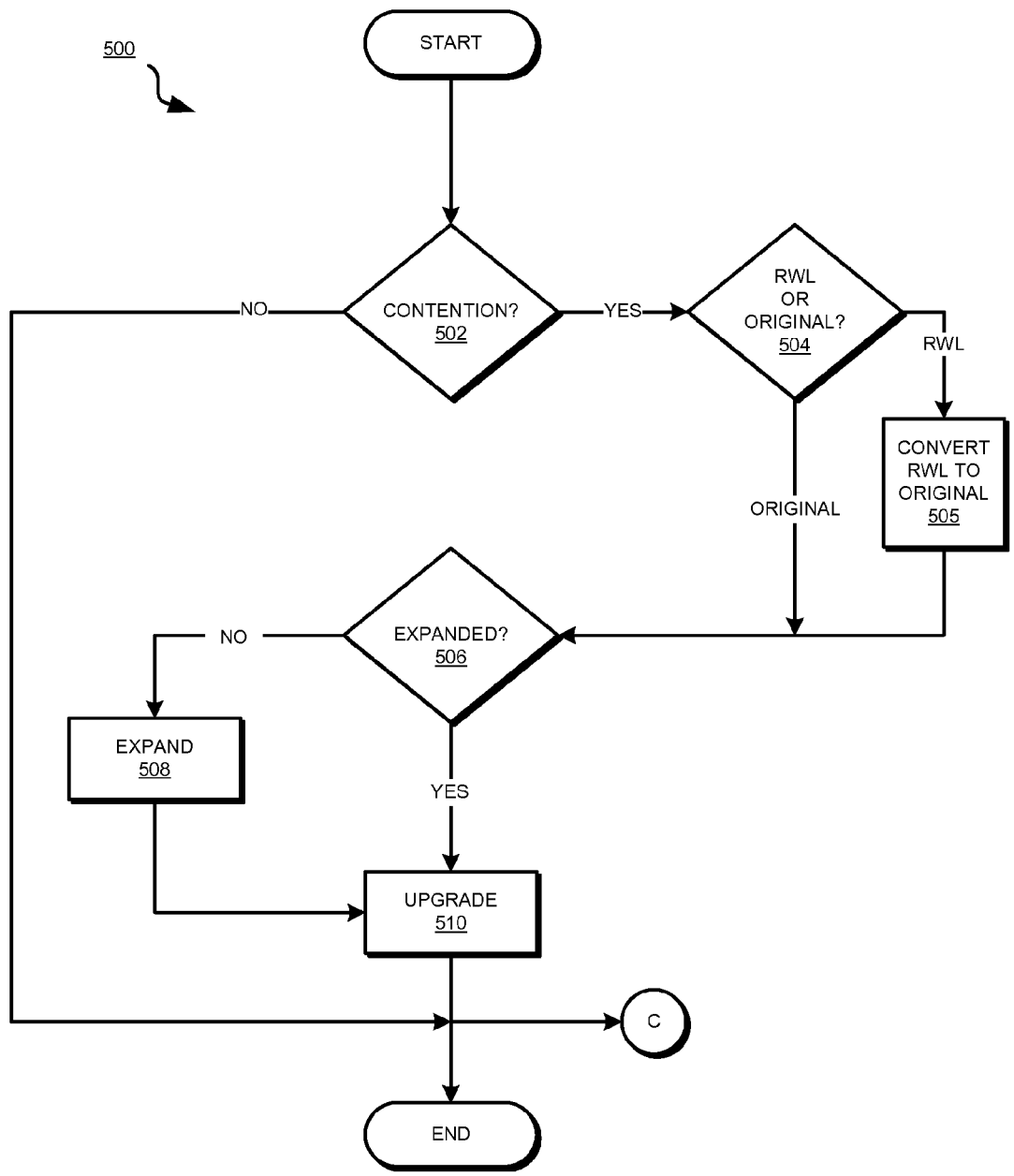
FIG. 5 depicts a flowchart of a process of transitioning a legacy lock into a DML in accordance with an illustrative embodiment.

With reference to FIG. 5, this figure depicts a flowchart of a process of transitioning a legacy lock into a DML in accordance with an illustrative embodiment. Process 500 may be implemented in an application that manages locks in a data processing system, such as an operating system or a component thereof of server 104 in FIG. 1.

Process 500 begins by determining whether a contention condition exists with respect to a lock in a data processing system (step 502). If a contention condition does not exist ("No" path of step 502), process 500 ends thereafter, or returns to step 502 for monitoring the demand on the lock. If a contention condition exists ("Yes" path of step 502), process 500 determines whether the lock is a RWL or an original lock used as a RWL (step 504).

If the lock that is experiencing a contention condition is an original lock ("Original" path of step 504), process 500 proceeds to step 506. If the lock is a RWL ("RWL" path of step 504), process 500 converts the RWL structurally into an original lock usable in a DML according to an embodiment (step 505). An original lock now exists with respect to which the contention condition exists. Process 500 then proceeds to step 506.

Process 500 determines whether the original lock has been expanded (step 506). As an example, assume that the lock as determined in step 504 is an original lock that has been expanded into a DML in the past. Such a DML may span the original lock and several expanded locks. As described with respect to an embodiment elsewhere in the disclosure, a DML may only use the original lock and may not be use the expanded locks under certain circumstances although the structure of the DML may continue to include the expanded locks. Thus, an original lock may indicate that the original lock has been expanded. Step 506 checks for this condition of the original lock.

If the original lock has been expanded ("Yes" path of step 506), process 500 proceeds to step 510. If the original lock has not been expanded, to with, expanded locks have not been allocated in memory and indexed within the original lock, ("No" path of step 506), process 500 expands the original lock (step 508). For example, in one embodiment, step 508 may cause parts of a pre-allocated memory region to be designated for use as an expanded lock. Once designated, the expanded lock may be indexed within the original lock.

Process 500 upgrades the original lock (step 510). The upgrade of the original lock may be accomplished in accordance with an embodiment described elsewhere in the disclosure. Process 500 ends thereafter. In one embodiment, process 500 may proceed to the exit point marked "C", which causes process 500 to execute another process in this disclosure with an entry point correspondingly marked "C".

Figure 6:
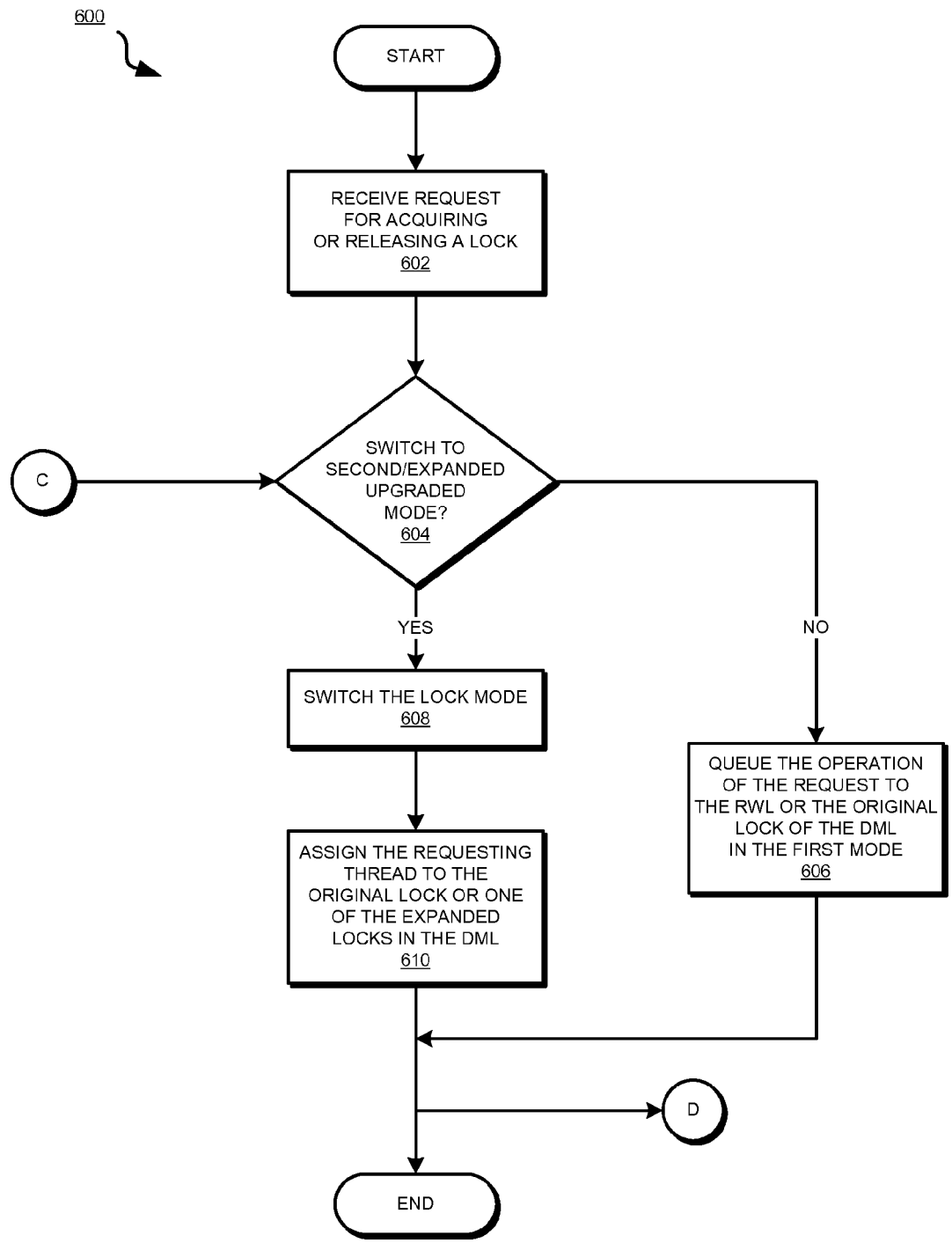
FIG. 6 depicts a flowchart of a process of transitioning thread requests from using a legacy lock to use a DML in accordance with an illustrative embodiment.

With reference to FIG. 6, this figure depicts a flowchart of a process of transitioning thread requests from using a legacy lock to use a DML in accordance with an illustrative embodiment. Process 600 may execute in an application where process 500 in FIG. 5 may execute. Process 600 executes to transition executing threads in an operation data processing system without having to stop the threads, processes, applications, or the data processing system for the reconfiguration of locks.

Process 600 begins by receiving a request for acquiring or releasing a lock (step 602). In one embodiment, step 602 may occur prior to step 502 in FIG. 5. In such an embodiment, process 600 may begin at step 604 instead of step 602.

Process 600 determines whether to switch the DML to the second mode of operation using the expanded and upgraded DML (step 604). The DML being considered in step 604 may be the DML created as a result of an execution of process 500 in FIG. 5. As described elsewhere, a DML may operate in two modes—the first mode using only the original lock as a legacy lock, and the second mode using the original and the expanded locks in the manner of an embodiment. Step 604 also serves as the entry point marked "C" where another process, such as process 500 in FIG. 5 may enter process 600.

Under certain circumstances, process 600 may determine that the DML should not operate in the second mode ("No" path of step 604). Under such circumstances, process 600 queues the operation requested in step 602 to the RWL or the original lock of the DML in the first mode (step 606). Process 600 ends thereafter. In one embodiment, process 600 may proceed to the exit point marked "D", which causes process 600 to execute another process in this disclosure with an entry point correspondingly marked "D".

If process 600 determines to switch the mode of the DML to the second mode ("Yes" path of step 604), process 600 switches the mode of the DML to the second mode of operation (step 608). The DML operating under the switched mode is thus configured to utilize the expanded locks.

Process 600 assigns the requesting thread to the original lock or one of the expanded locks of the DML (step 610). Process 600 ends thereafter. In one embodiment, process 600 may proceed to the exit point marked "D", which causes process 600 to execute another process in this disclosure with an entry point correspondingly marked "D".

Assignment of the threads to a particular element of the DML is described with respect to an embodiment in this disclosure. For example, one consideration in assigning a thread to the original lock element or the expanded lock is whether the thread wishes to perform an operation relating to a write lock or a read lock.

Figure 7:
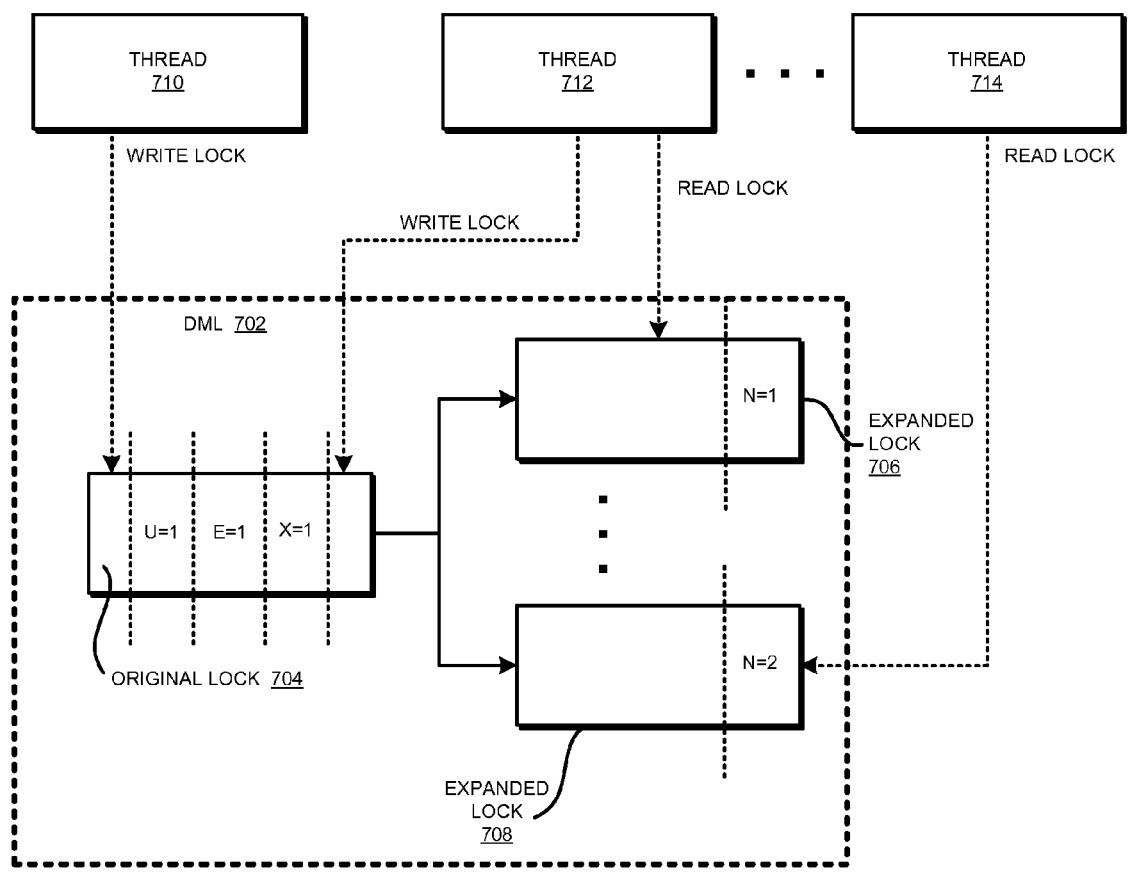
FIG. 7 depicts a block diagram of a DML configuration operating in accordance with an illustrative embodiment.

With reference to FIG. 7, this figure depicts a block diagram of a DML configuration operating in accordance with an illustrative embodiment. DML 702 may be similar to DML 304 in FIG. 3 or DML 404 in FIG. 4. DML 702 may be a DML with respect to which process 500 in FIG. 5 or process 600 in FIG. 6 may be implemented.

DML 702 includes original lock 704. As an example, original lock 704 is depicted to have updated indicator, expanded indicator, and expandable indicator set to a value 1. These example values of these example indicators in one embodiment inform that DML 702 is operating in the second mode. Other values of these or other indicators to provide similar information about the mode of operation are contemplated within the scope of the invention.

Only as an example, DML 702 is further depicted as including expanded locks 704 and 706. In an embodiment, DML 702 may include any number of similar expanded locks without limitation.

Further as an example, expanded lock 704 is shown to have a lock number identifier set to the value 1, the lock number identifier of expanded lock 706 being set to the value 2. These values are depicted only as an example way of uniquely reference expanded locks 704 and 706 in DML 702. Any number, value, locator, or indication may be used in the lock number identifier or a similarly usable identifier in expanded locks 704 and 706 to uniquely reference and index each expanded lock in DML 702.

Threads 710, 712, and 714 may be threads wanting to acquire or release a lock on a resource managed using DML 702. Any number of threads similar to threads 710, 712, and 714 may manipulate a lock using DML 702 in a similar manner within the scope of the invention.

In one example scenario for using DML 702, thread 710 may wish to acquire a write lock, thread 712 may wish to release a read lock and acquire a write lock, and thread 714 may wish to acquire a read lock. According to one embodiment of assigning threads to the various elements of DML 702, thread 710 may be assigned to original lock 704. Thread 712 may be assigned to original lock 704 for the write lock related request and to expanded lock 706 for the read lock related request. Thread 714 may be assigned to expanded lock 708. Write lock requests, such as those from threads 710 and 712, may have to wait for certain conditions to occur in DML 702 with respect to the existing read or write locks.

Thus, DML 702 may be used for threads 710, 712, and 714 such that the atomic operations relating to lock requests of these threads are distributed across different lock words holding different elements of DML 702. Used in this manner, DML 702 may allow several atomic operations to proceed concurrently on the same lock—DML 702—managing a common resource.

In some cases, DML 702 may make combining atomic operations possible. For example, under certain circumstances, release of a lock and acquisition of a lock may be performable in a combined single atomic operation using DML 702.

Figure 8:
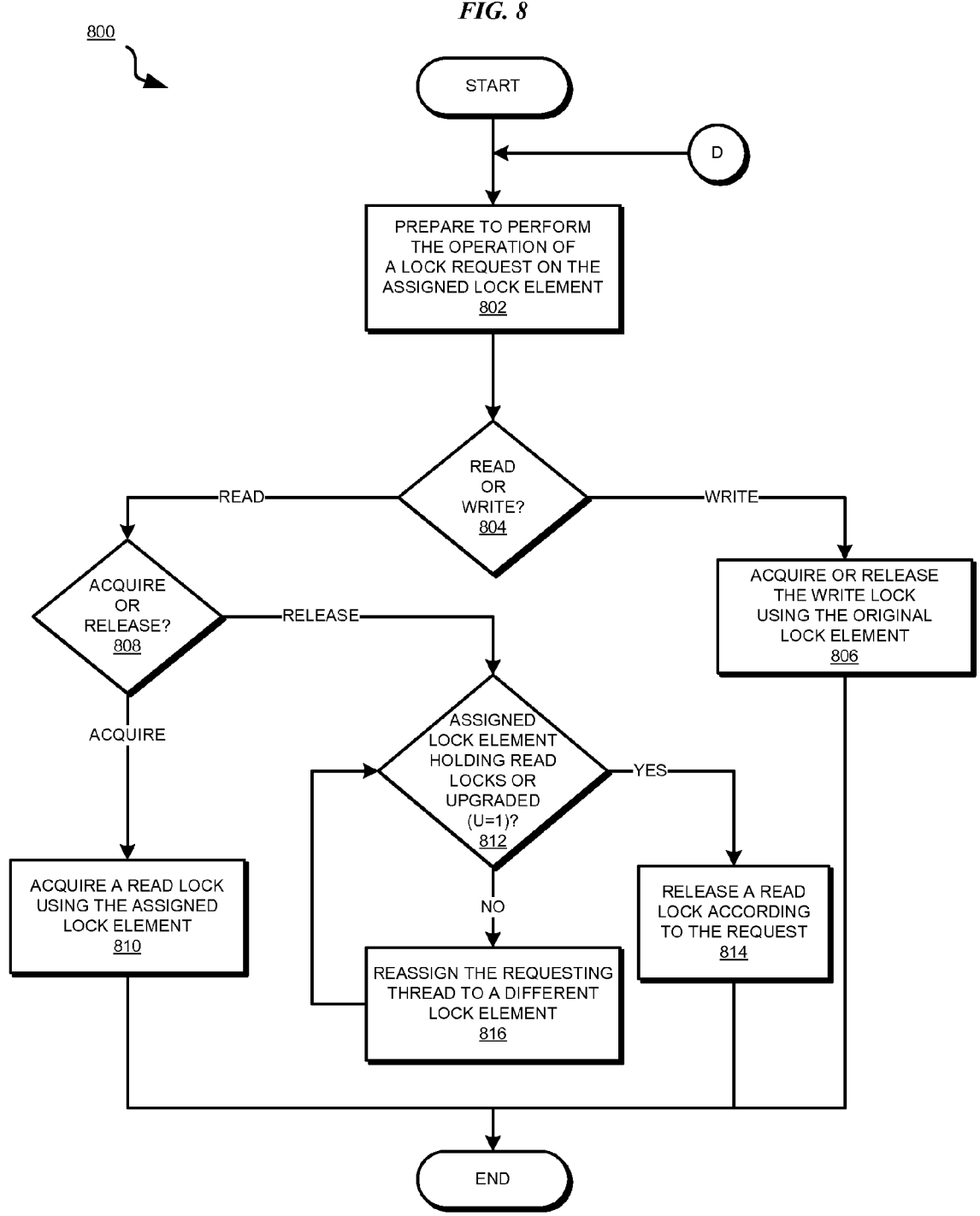
FIG. 8 depicts a flowchart of a process of using a DML in accordance with an illustrative embodiment.

With reference to FIG. 8, this figure depicts a flowchart of a process of using a DML in accordance with an illustrative embodiment. Process 800 may be implemented in an application that manages locks in a data processing system, such as an operating system or a component thereof of server 104 in FIG. 1 where DML 107 in FIG. 1 is configured.

Process 800 prepares to perform the operation of a lock request using an assigned element of a DML (step 802). The operation of the lock request may be an operation to acquire or release a read or write lock on a resource managed by the DML. Step 802 also serves as the entry point marked "D" where another process, such as process 600 in FIG. 6 may enter process 800.

Process 800 determines whether the operation of the lock request pertains to a read lock or a write lock on the resource (step 804). If the operation pertains to acquiring or releasing a write lock on the resource ("Write" path of step 804), process 800 acquires or releases the write lock using the original lock of the DML (step 806). Process 800 ends thereafter.

If the operation pertains to acquiring or releasing a read lock on the resource ("read" path of step 804), process 800 determines whether the request is for acquiring a read lock or releasing a read lock (step 808). If the request is for acquiring a read lock ("Acquire" path of step 808), process 800 acquires a read lock using the assigned lock element, such as the expanded lock number assigned to the requesting thread, (step 810). Process 800 ends thereafter.

More steps may be included in process 800 for executing step 810, such as for executing step 810 according to certain rules of using the DML. Such steps may be used before step 810 executes, after process 810 executes, or before process 800 ends. Some example rules pertaining to specific operations using a DML of the invention are described elsewhere in the disclosure.

Returning to step 808, if process 800 determines that the request is for releasing a read lock ("Release" path of step 808), process 800 determines whether the assigned expanded lock element is holding any read locks (step 812). Alternatively, or in combination with this determination, in step 812, process 800 may determine whether the DML has been upgraded. For example, process 800 may determine whether a bit representing the upgraded indicator in the original lock of the DML is set to a value 1.

If process 800 determines that the assigned expanded lock element is holding one or more read locks, the DML has been upgraded, or both, ("Yes" path of step 812), process 800 releases a read lock from the assigned expanded lock element according to the request (step 814). Process 800 ends thereafter. If process 800 determines that the assigned expanded lock element is not holding any read locks, the DML has been downgraded, or both, ("No" path of step 812), process 800 reassigns the requesting thread to a different DML element (step 816). Process 800 returns to step 812 thereafter. Reassignment of a thread to an element of the DML is a process similar to the assignment of a thread to a DML element, as described elsewhere in the disclosure.

For example, between the time at which the lock request came in and the time at which process 800 prepared to execute the operation of the request, the DML may have been downgraded as a contention condition may have abated. Thus, while the requesting thread was correctly assigned to a particular expanded lock element of the DML at the time the request came in, the expanded lock elements were no longer in use at the time of execution of the operation of the request.

As another example, between the time the lock request came in and the time process 800 prepared to execute the operation of the request, the lock count of the assigned expanded lock may reduce to zero. Thus, while the assigned expanded lock element of the DML may have been holding a non-zero number of read locks at the time the request came in, the expanded lock element may have released all those locks before the time of execution of the operation of the request and may not be holding any more locks to release.

Figure 9:
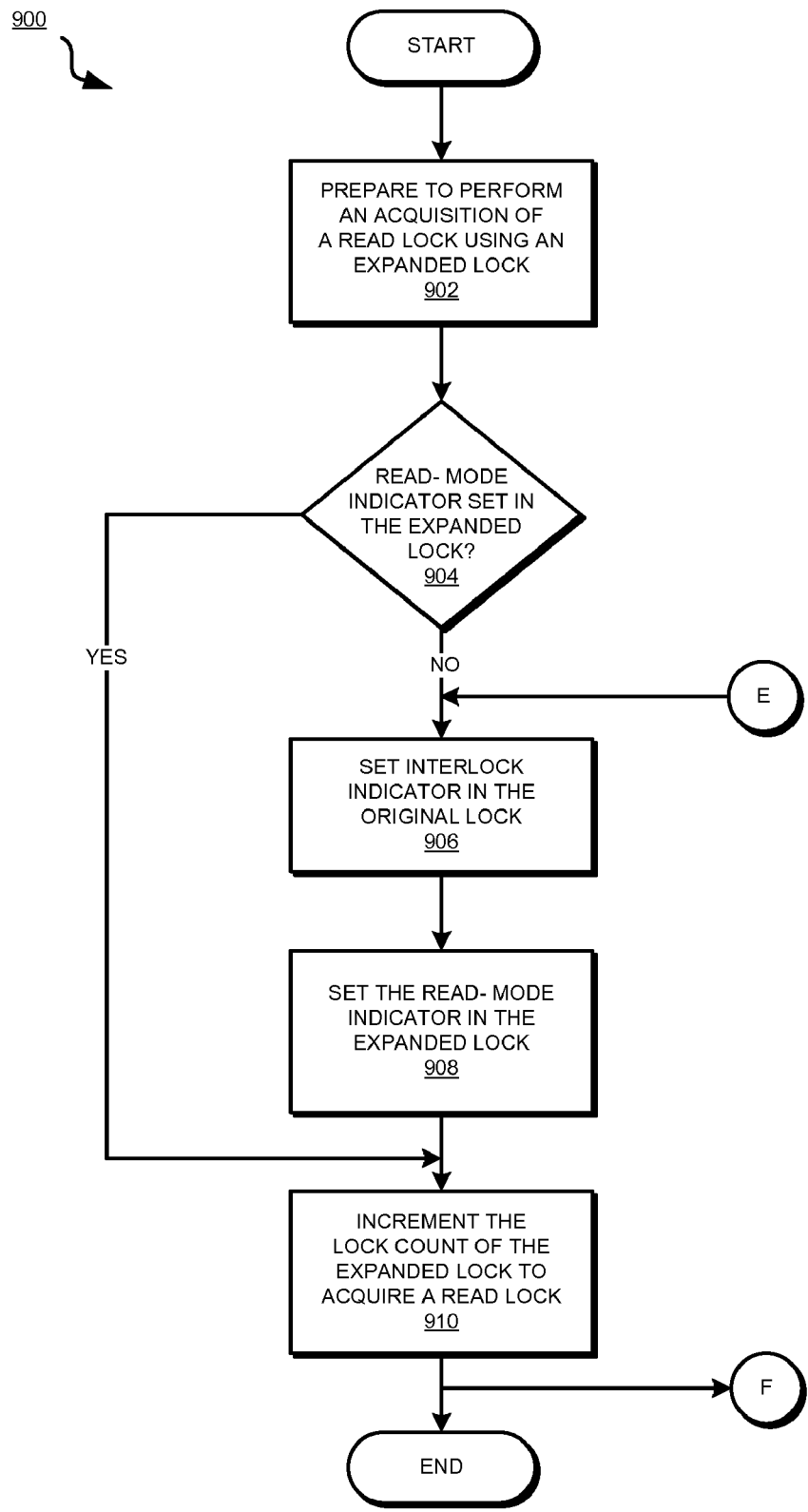
FIG. 9 depicts a flowchart of a process of an example rule for using a DML in accordance with an illustrative embodiment.

With reference to FIG. 9, this figure depicts a flowchart of a process of an example rule for using a DML in accordance with an illustrative embodiment. Process 900 may be executed where process 800 in FIG. 8 may be executing. An example rule in using the DML according to an embodiment may be that a read lock cannot be acquired using an expanded lock element of a DML when the read-mode indicator of the expanded lock element has not been set to a particular value. Process 900 describes an example way of implementing such an example rule.

Process 900 prepares to perform an acquisition of a read lock using an expanded lock element of a DML (step 902). Process 900 determines whether a read-mode indicator has been set in the expanded lock (step 904).

If the read-mode indicator of the expanded lock has not been set, for example, when a bit representing the read-mode indicator holds a value of 0, ("No" path of step 904), process 900 sets an interlock indicator in the original lock (step 906).

Step 906 also serves as the entry point marked "E" where another process may enter process 900.

In order to maintain integrity of the DML, an implementation may desire to perform setting or resetting of certain indicators by temporarily suspending lock activity in other elements of the DML. As an example, an interlock indicator in the original lock element of the DML may be used to perform such suspension, interlocking, setting, or resetting.

Interlocking is the dependency of one step or process over another. A step, process, or operation is said to be interlocked with another step, process, or operation when one step, process, or operation has to wait or be suspended while the other step, process, or operation is being performed. The interlock indicator helps coordinate the execution of interlocked steps, processes, or operations.

Following the "No" path of step 904, process 900 may set the interlock indicator in the original lock (step 906). Process 900 may then set the read-mode indicator in the expanded lock (step 908). Process 900 may then increment the lock count of the expanded lock to acquire the read lock according to the operation of step 902 (step 910). Process 900 may end thereafter.

Returning to step 904, if the read-mode indicator of the expanded lock element is already set ("Yes" path of step 904), process 900 may perform step 910. Process 900 may end thereafter. In one embodiment, process 900 may proceed to the exit point marked "F", which causes process 900 to execute another process in this disclosure with an entry point correspondingly marked "F".

Although not shown in process 900 or other processes, the interlock indicator may be reset after a desired interlocked operation is complete. For example, process 900 may reset the interlock indicator after step 908 has been executed.

Further, in any of the disclosed processes, any step may be combined with any other step such that they may be performed together, in parallel, sequentially, or in any other suitable manner in an implementation. For example, two or more steps may be combined into a single atomic operation where efficiency gain can be realized by doing so. As an example, steps 908 and 910 may be combined into a single atomic operation in one implementation of an embodiment of the invention.

Figure 10:
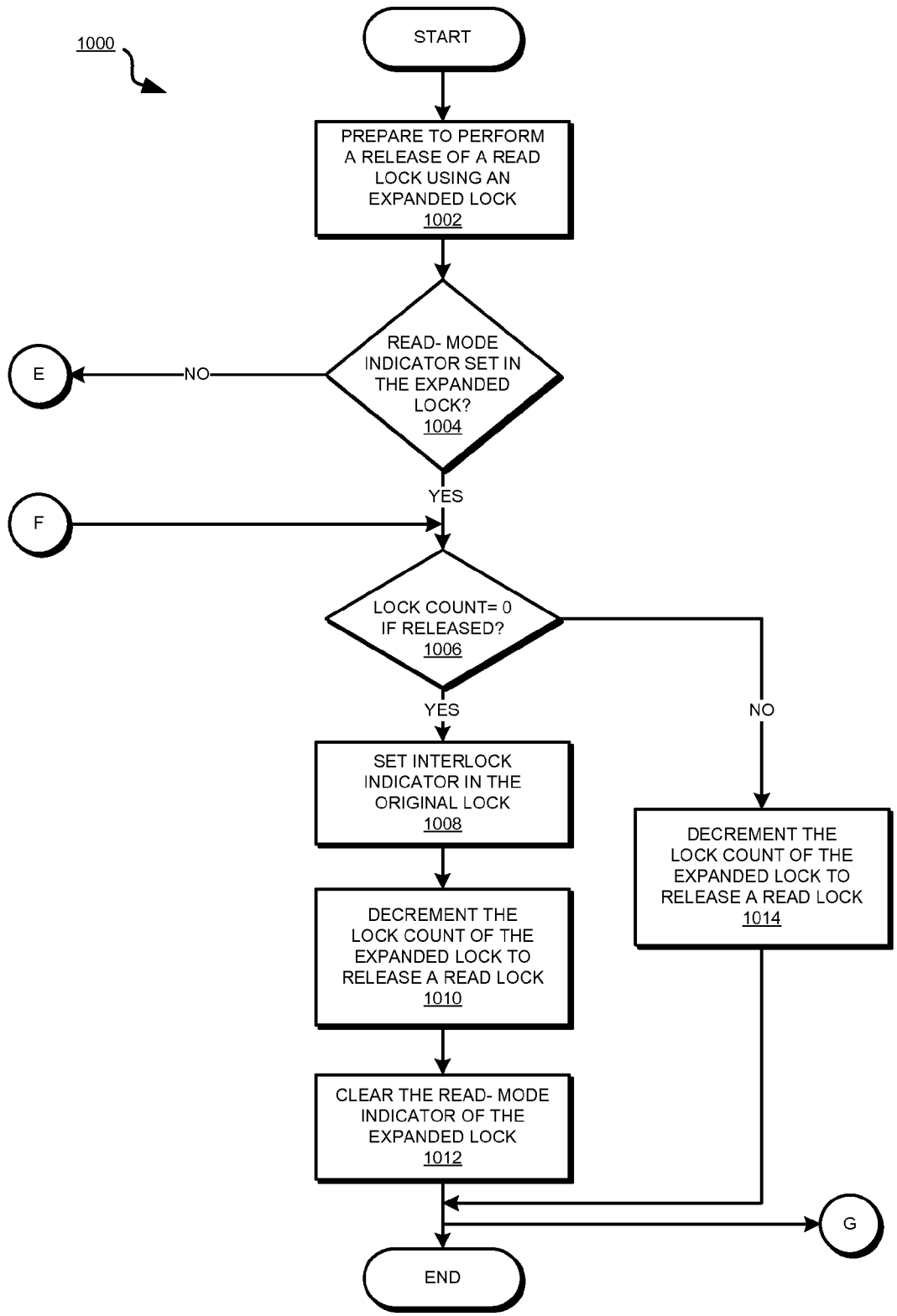
FIG. 10 depicts a flowchart of a process of another example rule for using a DML in accordance with an illustrative embodiment.

With reference to FIG. 10, this figure depicts a flowchart of a process of another example rule for using a DML in accordance with an illustrative embodiment. Process 1000 may be executed where process 900 in FIG. 9 may execute. Another example rule in using the DML according to an embodiment may be that a lock count of a DML may not be reduced to zero, the read-mode indicator cleared, or both, without setting the interlock indicator. Process 1000 describes an example way of implementing such an example rule.

Process 1000 may prepare to perform a release of a read lock using an expanded lock element of a DML (step 1002). Process 1000 determines whether the read-mode indicator of the expanded lock element is set (step 1004). If the read-mode indicator is not set ("No" path of step 1004), process 1000 exits at the exit point marked "E", which causes process 1000 to execute another process in this disclosure, such as process 900 in FIG. 9, with an entry point correspondingly marked "E".

If process 1000 exits at exit point "E", process 1000 may reenter at entry point marked "F" and resume processing. For example, process 1000 may exit at exit point "E", perform parts of process 900 in FIG. 9 between the entry point "E" and exit point "F" in process 900, and then reenter process 1000 at entry point "F".

Process 1000 may determine at step 1004 that the read-mode indicator of the expanded lock is set to a desired value ("Yes" path of step 1004). Either by following the "Yes" path of step 1004 or by reentering process 1000 at entry point "F", process 1000 determines whether the lock count of the DML will reduce to zero if a lock is released as requested in step 1002 (step 1006).

If the lock count will reduce to zero, in other words, if the lock to be released is the last lock held by the DML, ("Yes" path of step 1006), process 1000 sets the interlock indicator in the original lock (step 1008). Process 1000 decrements the lock count of the expanded lock element to release the lock as requested (step 1010). Process 1000 clears the read-mode indicator of the DML (step 1012). Process 1000 ends thereafter.

If the lock count will not reduce to zero upon release as requested ("No" path of step 1006), process 1000 decrements the lock count of the expanded lock element to release the lock as requested (step 1014). Process 1000 ends thereafter.

In one embodiment, process 1000 may not end after steps 1012 or 1014. Instead, process 1000 may proceed to the exit point marked "G", which causes process 1000 to execute another process in this disclosure with an entry point correspondingly marked "G".

In one embodiment, the interlock indicator may be reset at a suitable point in process 1000. In another embodiment, the interlock indicator may be left in the set condition for subsequent operations, such as for executing another process following the exit at exit point "G".

In one embodiment, when a thread wishes to release a lock held in read mode, the element that is most likely to hold the count for that thread is identified. If the read mode bit is set, the lock count must be a non-zero value. In such an embodiment, while executing process 1000 at step 1004 if the read-mode indicator is not set, the embodiment may determine that some other element of the DML holds the count for that thread. In that case, the thread may decrement the read lock count in an element of the DML that contains a positive lock count. An embodiment in this disclosure describes one process of reassigning a thread to a different element for performing such operations.

Figure 11:
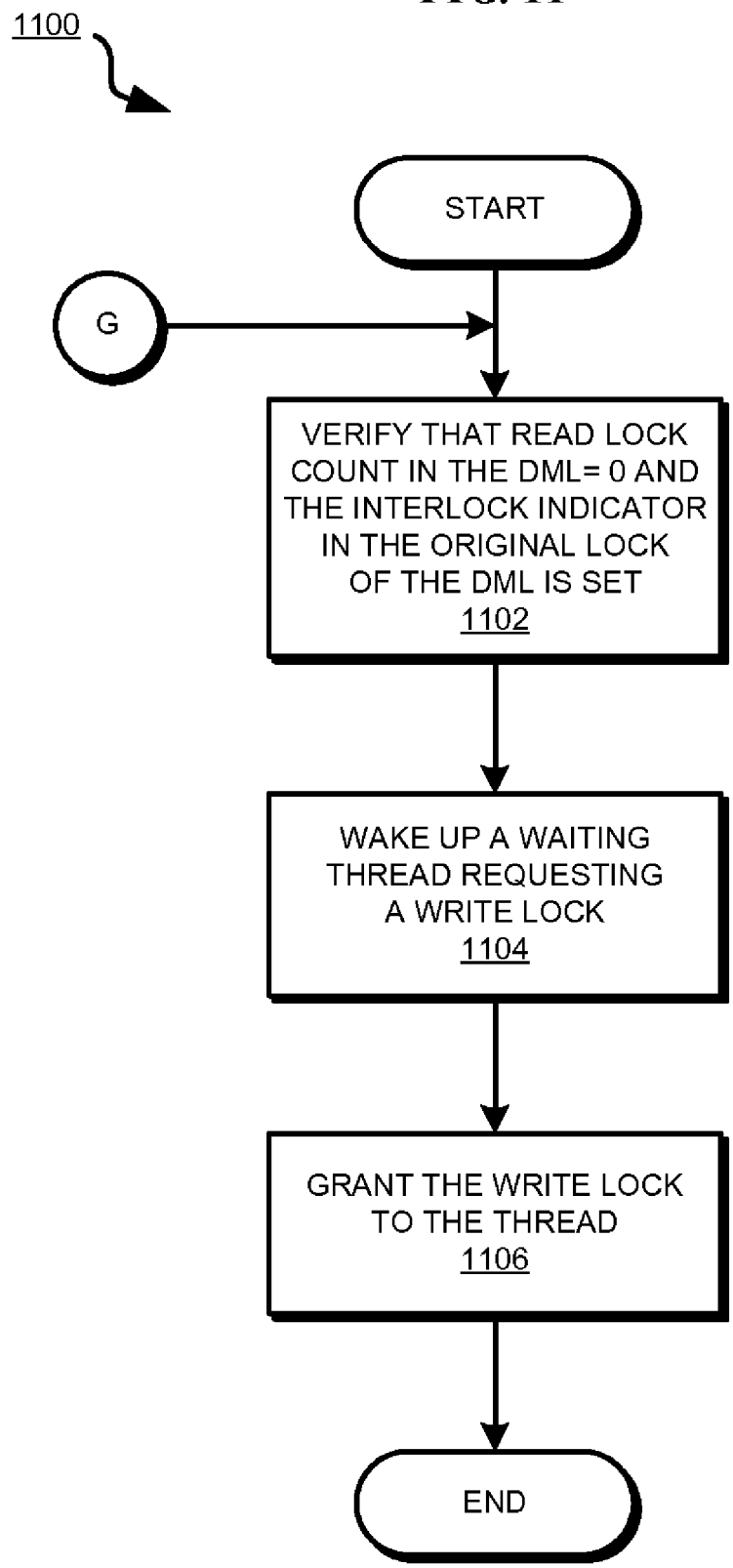
FIG. 11 depicts a flowchart of a process of performing waiting lock operations using a DML in accordance with an illustrative embodiment.

With reference to FIG. 11, this figure depicts a flowchart of a process of performing waiting lock operations using a DML in accordance with an illustrative embodiment. Process 1100 may be implemented where process 1000 of FIG. 10 may execute.

As described earlier in the disclosure, write locks are granted exclusively on the resource and no other thread can hold a write lock or a read lock on the resource when a write lock is granted or being held. When a thread requests a write lock, and the DML is holding one or more read locks or write locks, the thread is placed in a wait mode until the write lock can be granted exclusively to the thread. Process 1100 is one example implementation of granting an exclusive write lock using a DML according to an embodiment.

Process 1100 begins by verifying that the read lock count in the DML is zero and the interlock indicator is set (step 1102). If the interlock indicator has been reset, the interlock indicator may be set again at step 1102. Step 1102 may be omitted, for example, when the interlock indicator is known to be in a set condition. Step 1102 also serves as the entry point marked "G" where another process such as process 1000 in FIG. 10, may enter process 1100.

Process 1100 may wake up a waiting thread that may have requested a write lock (step 1104). Process 1100 grants the write lock to the thread (step 1106). Process 1100 ends thereafter. The interlock indicator may be reset at a suitable point in process 1100.

Figure 12:
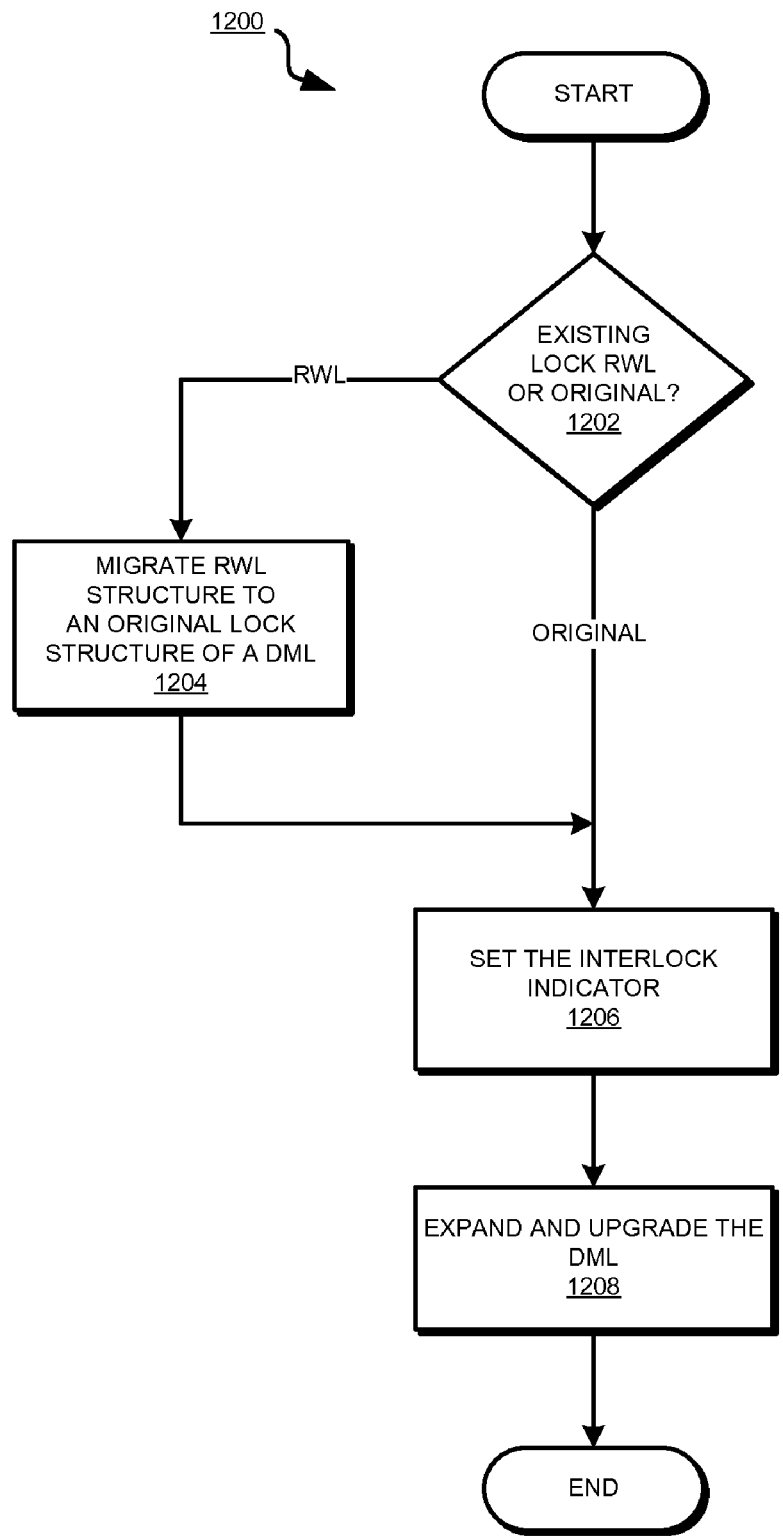
FIG. 12 depicts a flowchart of a process of another example rule for using a DML in accordance with an illustrative embodiment.

With reference to FIG. 12, this figure depicts a flowchart of a process of another example rule for using a DML in accordance with an illustrative embodiment. Process 1200 may be implemented where any of the other processes for using a DML according to an embodiment may execute.

An example rule for using a DML in accordance with an embodiment may be that a DML may be expanded and upgraded only after the interlock indicator has been set. Process 1200 describes an example implementation of such an example rule.

An existing lock associated with a resource in a data processing system may be holding zero or more locks on the resource. Process 1200 begins by determining whether the existing lock implementation uses a RWL or a DML in the first mode, to with, a DML using only the original lock (step 1202). If the existing lock is implemented using a RWL ("RWL" path of step 1202), process 1200 migrates the RWL structure to an original lock structure of a DML according to an embodiment (step 1204). An example process of transitioning a RWL to a DML according to an embodiment is described in this disclosure. That process or a similar combination of transitioning steps may be used in executing step 1204. Process 1200 proceeds to step 1206.

If the existing lock is implemented using an original lock structure ("Original" path of step 1202), process 1200 sets the interlock indicator (step 1206). If the existing lock is held using the structure of the original lock, the original lock is already a part of a DML that may be operating in the first mode. The DML may or may not have been already expanded previously.

Assuming that the DML has not been expanded previously, process 1200 expands and upgrades the DML (step 1208). If the DML has been expanded previously but was later downgraded, process 1200 may simply upgrade the DML in step 1208. Process 1200 ends thereafter. The interlock indicator may be reset at a suitable point in process 1200.

Figure 13:
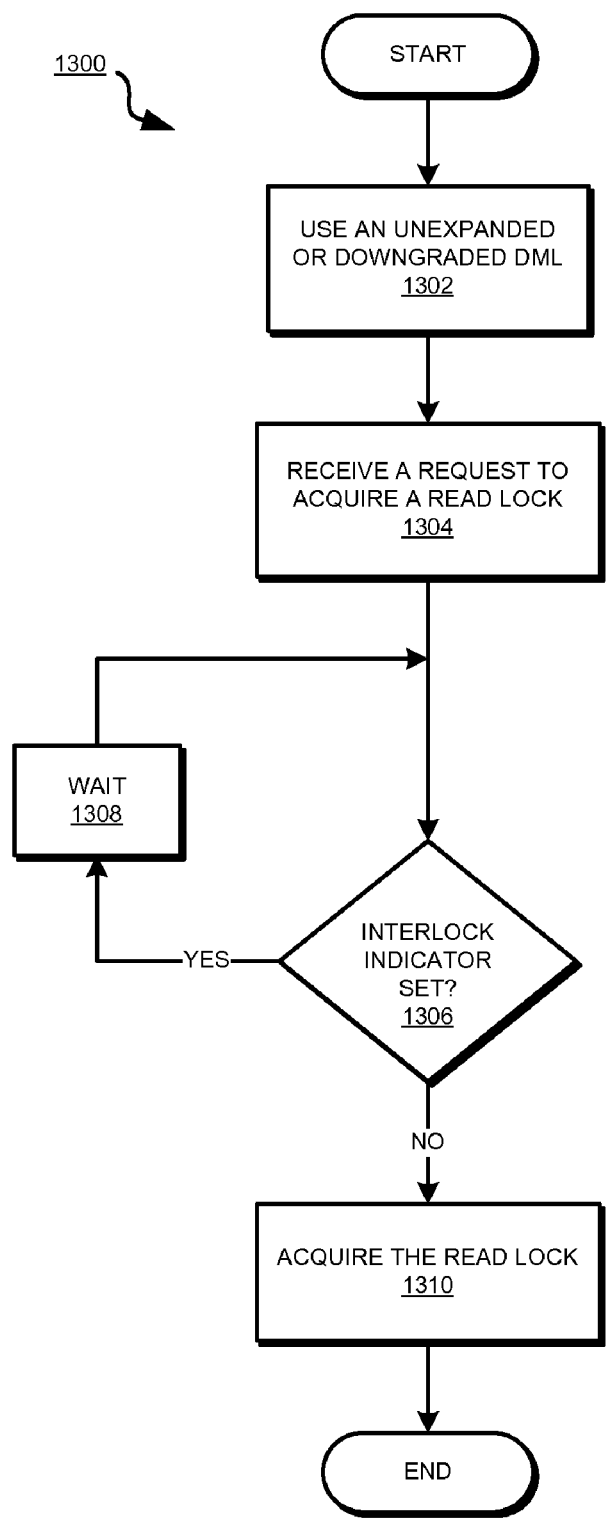
FIG. 13 depicts a flowchart of a process of interlocking a read lock operation while using a DML in accordance with an illustrative embodiment.

With reference to FIG. 13, this figure depicts a flowchart of a process of interlocking a read lock operation while using a DML in accordance with an illustrative embodiment. Process 1300 may be implemented in a manner similar to process 1200 in FIG. 12.

As described earlier, certain steps, processes, or operations may have to be executed while the interlock indicator of the DML is set. Other steps, processes, or operations may have to wait until the interlock indicator of the DML is reset before such steps, processes, or operations can proceed. Process 1300 describes such an interlock mechanism in accordance with an embodiment.

Process 1300 may be using an unexpanded DML operating in the first mode or a DML that has been expanded but operating in the first mode as downgraded (step 1302). Process 1300 may receive a request to acquire a read lock on the resource managed by the DML (step 1304).

Process 1300 determines whether the interlock indicator of the DML has been set (step 1306). If the interlock indicator has been set ("Yes" path of step 1306), process 1300 causes the thread of the request of step 1304 to wait (step 1308).

If process 1300 determines that the interlock indicator is not set, such as when an interlocked operation has completed and the interlock indicator has been reset, ("No" path of step 1306), process 1300 allows the thread to acquire the read lock (step 1310). Process 1300 ends thereafter.

Figure 14:
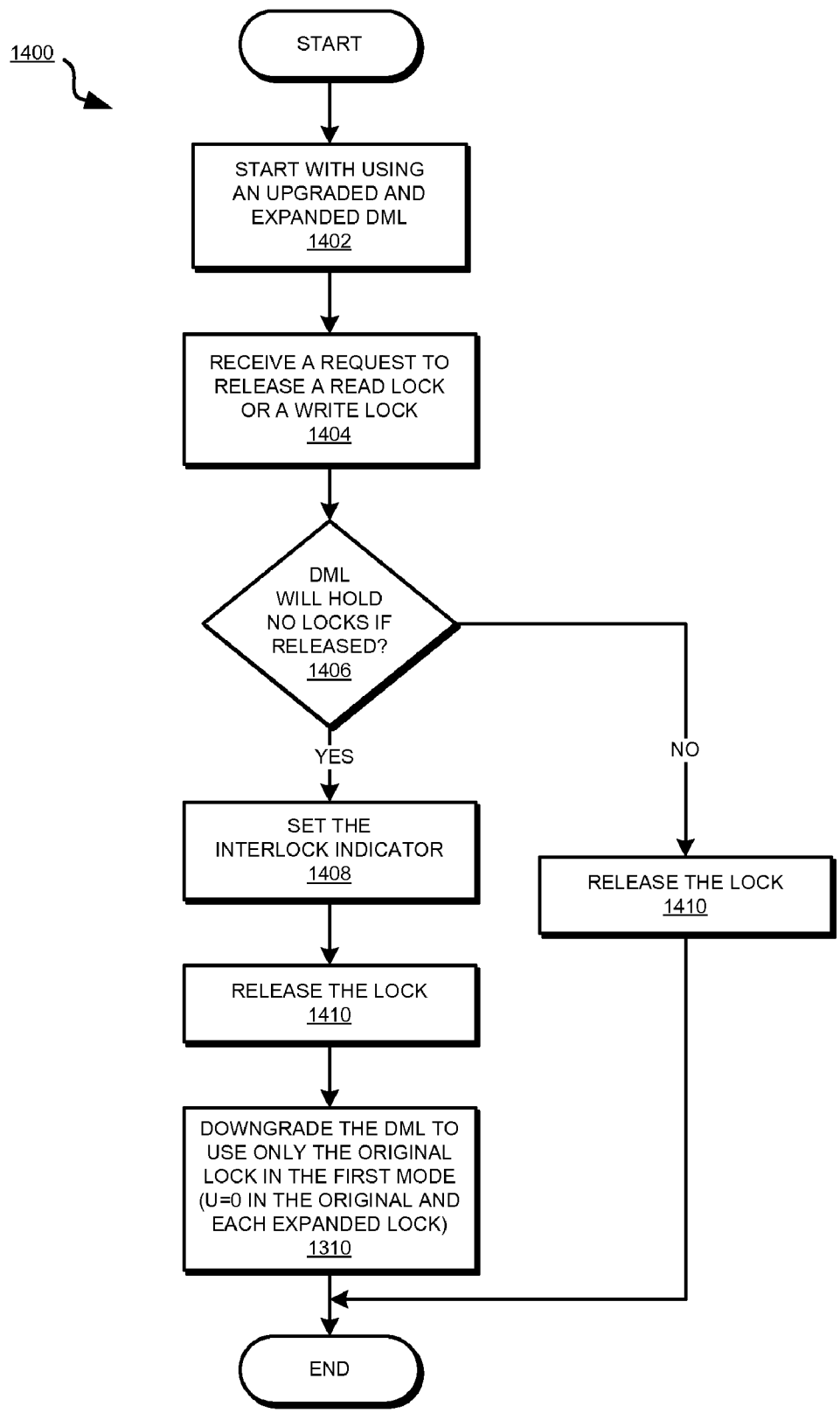
FIG. 14 depicts a flowchart of a process of downgrading a DML in accordance with an illustrative embodiment.

With reference to FIG. 14, this figure depicts a flowchart of a process of downgrading a DML in accordance with an illustrative embodiment. Process 1400 may be implemented where any of the other processes according to any embodiment may be executed.

Process 1400 may start with using an upgraded and expanded DML according to an embodiment (step 1402). Process 1400 may receive a request to release a read lock or a write lock (step 1404).

Process 1400 determines whether, upon releasing the lock as requested in step 1404, the DML will be in a state where the DML will be holding no locks on the associated resource (step 1406). If the DML will hold no locks on the resource after the requested release ("Yes" path of step 1406), process 1400 sets the interlock indicator (step 1408). Process 1400 releases the lock (step 1410). Process 1400 downgrades the DML such that the DML uses only the original lock element in the first mode of DML operation (step 1412). Process 1400 ends thereafter.

If process 1400 determines that the DML will still be holding one or more locks on the resource after a lock is released as requested in step 1404 ("No" path of step 1406), process 1400 releases the lock (step 1414). Process 1400 ends thereafter. The interlock indicator may be reset at a suitable point in process 1400.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for using a dual mode reader writer lock. Using the embodiments of the invention, a data processing system can operate with improved efficiency under lock contention conditions. Using the embodiment, a data processing system can operate with improved efficiency also when a RWL is saturated and can hold no more locks.

A DML according to an embodiment can operate as a presently used RWL, using only the original lock element of the expanded or unexpanded DML, when demand for the lock is below a threshold. When the demand for the lock reaches or exceeds the threshold, to with, when a contention condition exists for the lock, the DML can transform to operate using expanded locks. In other words, a DML according to an embodiment can be upgraded to operate in the expanded mode or downgraded to operate in the original mode depending on the demand for the lock.

The structure of a lock, whether a RWL or a DML is a data structure in any suitable data storage location. In one embodiment, an existing RWL may occupy less than 1 data word of space. In such an embodiment, the original lock and one or more expanded locks can be accommodated within 1 data word within the scope of the illustrative embodiments. Expanded locks have been described as holding reader locks only as some example embodiments of the invention. Upon suitable modifications, expanded locks can be used for holding a combination of types of locks, including write locks.

An embodiment of the invention may facilitate maintaining the integrity of the DML while operating the DML. As one example method for maintaining the integrity of the DML, the interlock indicator may be set to cause one operation to wait while another completes with respect to one or more elements of the DML. Other indicators, different indicators than those described, or a combination thereof, may be used in a similar manner to implement a DML that can be operated while maintaining the lock's integrity. An indicator may be relocated to other elements of the DML than the element the indicator has been described in, within the scope of the invention.

The rules described in particular embodiments are only examples and are not intended to limit the scope of the invention. Any rule may be implemented in a manner similar to the rules described in this disclosure within the scope of the invention.

The embodiments of the invention can collaborate with existing lock management applications. The embodiments can also allow existing applications and processes to transparently use DML where they were only configured to use presently used RWLs. Furthermore, during use, DML mode can change while the applications and processes using the DML remain unaware of such transitions.

The invention can take the form of an entirely software embodiment, or an embodiment containing both hardware and software elements. In a preferred embodiment, the invention is implemented in software or program code, which includes but is not limited to firmware, resident software, and microcode.

Furthermore, the invention can take the form of a computer program product accessible from a computer-usable or computer-readable medium providing program code for use by or in connection with a computer or any instruction execution system. For the purposes of this description, a computer-usable or computer-readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W) and DVD.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for using a dual mode reader writer lock (DML), the computer implemented method comprising:
   detecting a contention condition in the use of a lock in a data processing system, the lock being used for managing read and write access to a resource in the data processing system;
   determining a data structure used for implementing the lock;
   responsive to the data structure being a data structure of a reader writer lock (RWL), transitioning the data structure to a second data structure suitable for implementing the DML;
   determining whether the DML has been expanded;
   responsive to the DML not having been expanded, expanding the DML such that the data structure includes an original lock and a set of expanded locks, the original lock and each expanded lock in the set of expanded locks forming an element of the DML;
   receiving a request from a process in the data processing system to perform an operation using the DML;
   determining whether to switch a mode of operation of the DML from a first mode to a second mode, the first mode of operation of the DML using the original lock of the DML, and the second mode of operation of the DML using the original lock and a subset of the expanded locks;
   switching the mode of operation of the DML to the second mode responsive to a determination to switch to the second mode; and
   assigning the process to one of the elements of the DML, the one of the elements forming an assigned element.

2. The computer implemented method of claim 1, further comprising:
   setting an interlock indicator in the DML to a first value;
   setting an expanded indicator in the DML to a second value corresponding to the expanded state of the DML; and setting an upgraded indicator in the DML to a third value indicating that the DML is using the set of expanded locks.

3. The computer implemented method of claim 1, wherein the process is a thread of a second process.

4. The computer implemented method of claim 1, further comprising:
- determining, responsive to the request being for manipulating a read lock, whether the request is for acquiring the releasing the read lock;
- determining forming a second determination, responsive to the request being for releasing the read lock, one of (i) whether the assigned element is holding zero read locks, and (ii) whether the DML has been downgraded;
- reassigning the process to a second element in the DML responsive to the second determination being true.

5. The computer implemented method of claim 1, further comprising:
- preparing to perform an acquisition of a read lock using the DML;
- determining whether a read-mode indicator is set to a fourth value in an element of the DML;
- setting an interlock indicator in the DML to a first value responsive to the read-mode indicator not being set to the third value;
- setting the read-mode indicator to the fourth value after setting the interlock indicator to the first value; and
- acquiring the read lock using one of the elements of the DML.

6. The computer implemented method of claim 5, further comprising:
- resetting the interlock indicator.

7. The computer implemented method of claim 1, further comprising:
- preparing to perform an release of a read lock using the DML;
- determining whether a read-mode indicator is set to a fourth value in an element of the DML;
- setting an interlock indicator in the DML to a first value responsive to the read-mode indicator not being set to the fourth value;
- setting the read-mode indicator to the fourth value after setting the interlock indicator to the first value;
- determining, forming a third determination, whether a lock count of the DML will reduce to zero if the read lock is released;
- releasing the read lock using one of the elements of the DML; and
- resetting the read-mode indicator, responsive to the third determination being true.

8. The computer implemented method of claim 7, further comprising:
- downgrading the DML such that the DML operates in a first mode of operation, the first mode of operation of the DML using the original lock of the DML, and a second mode of operation of the DML using the original lock and a subset of the expanded locks.

9. The computer implemented method of claim 8, wherein the DML operating in the first mode remains expanded.

10. The computer implemented method of claim 7, further comprising:
- waking up a third process, the third process being in a waiting state, the third process having requested an operation with respect to a write lock on the resource; and
- granting the write lock on the resource to the third process.

11. The computer implemented method of claim 1, further comprising:
- receiving a request to acquire a read lock while using the DML that has been one of (i) unexpanded, and (ii) downgraded;
- causing the request to wait responsive to an interlock indicator being set to a first value; and
- performing the acquisition of the read lock according to the request when the interlock indicator has been reset.

12. A computer usable program product comprising a computer usable storage device including computer usable code for using a dual mode reader writer lock (DML), the computer usable code comprising:
- computer usable code for detecting a contention condition in the use of a lock in a data processing system, the lock being used for managing read and write access to a resource in the data processing system;
- computer usable code for determining a data structure used for implementing the lock;
- computer usable code for, responsive to the data structure being a data structure of a reader writer lock (RWL), transitioning the data structure to a second data structure suitable for implementing the DML;
- computer usable code for determining whether the DML has been expanded;
- computer usable code for, responsive to the DML not having been expanded, expanding the DML such that the data structure includes an original lock and a set of expanded locks, the original lock and each expanded lock in the set of expanded locks forming an element of the DML;
- computer usable code for receiving a request from a process in the data processing system to perform an operation using the DML;
- computer usable code for determining whether to switch a mode of operation of the DML from a first mode to a second mode, the first mode of operation of the DML using the original lock of the DML, and the second mode of operation of the DML using the original lock and a subset of the expanded locks;
- computer usable code for switching the mode of operation of the DML to the second mode responsive to a determination to switch to the second mode; and
- computer usable code for assigning the process to one of the elements of the DML, the one of the elements forming an assigned element.

13. The computer usable program product of claim 12, further comprising:
- computer usable code for setting an interlock indicator in the DML to a first value;
- computer usable code for setting an expanded indicator in the DML to a second value corresponding to the expanded state of the DML; and
- computer usable code for setting an upgraded indicator in the DML to a third value indicating that the DML is using the set of expanded locks.

14. The computer usable program product of claim 12, wherein the process is a thread of a second process.

15. The computer usable program product of claim 12, further comprising:
- computer usable code for determining, responsive to the request being for manipulating a read lock, whether the request is for acquiring the releasing the read lock; computer usable code for determining forming a second determination, responsive to the request being for releasing the read lock, one of (i) whether the assigned element is holding zero read locks, and (ii) whether the DML has been downgraded; computer usable code for reassigning the process to a second element in the DML responsive to the second determination being true.

16. The computer usable program product of claim 12, further comprising:
computer usable code for preparing to perform an acquisition of a read lock using the DML;
computer usable code for determining whether a read-mode indicator is set to a fourth value in an element of the DML;
computer usable code for setting an interlock indicator in the DML to a first value responsive to the read-mode indicator not being set to the third value;
computer usable code for setting the read-mode indicator to the fourth value after setting the interlock indicator to the first value; and
computer usable code for acquiring the read lock using one of the elements of the DML.

17. The computer usable program product of claim 16, further comprising:
computer usable code for resetting the interlock indicator.

18. The computer usable program product of claim 12, further comprising:
computer usable code for preparing to perform an release of a read lock using the DML;
computer usable code for determining whether a read-mode indicator is set to a fourth value in an element of the DML;
computer usable code for setting an interlock indicator in the DML to a first value responsive to the read-mode indicator not being set to the fourth value;
computer usable code for setting the read-mode indicator to the fourth value after setting the interlock indicator to the first value;
computer usable code for determining, forming a third determination, whether a lock count of the DML will reduce to zero if the read lock is released;
computer usable code for releasing the read lock using one of the elements of the DML; and
computer usable code for resetting the read-mode indicator, responsive to the third determination being true.

19. The computer usable program product of claim 18, further comprising:
computer usable code for downgrading the DML such that the DML operates in a first mode of operation, the first mode of operation of the DML using the original lock of the DML, and a second mode of operation of the DML using the original lock and a subset of the expanded locks.

20. The computer usable program product of claim 19, wherein the DML operating in the first mode remains expanded.

21. The computer usable program product of claim 18, further comprising:
computer usable code for waking up a third process, the third process being in a waiting state, the third process having requested an operation with respect to a write lock on the resource; and
computer usable code for granting the write lock on the resource to the third process.

22. The computer usable program product of claim 12, further comprising:
computer usable code for receiving a request to acquire a read lock while using the DML that has been one of (i) unexpanded, and (ii) downgraded;
computer usable code for causing the request to wait responsive to an interlock indicator being set to a first value; and
computer usable code for performing the acquisition of the read lock according to the request when the interlock indicator has been reset.

23. The computer usable program product of claim 12, wherein the computer usable code is stored in a computer readable storage medium in a data processing system, and wherein the computer usable code is transferred over a network from a remote data processing system.

24. The computer usable program product of claim 12, wherein the computer usable code is stored in a computer readable storage medium in a server data processing system, and wherein the computer usable code is downloaded over a network to a remote data processing system for use in a computer readable storage medium associated with the remote data processing system.

25. A data processing system for using a dual mode reader writer lock (DML), the data processing system comprising:
a storage device including a storage medium, wherein the storage device stores computer usable program code; and
a processor, wherein the processor executes the computer usable program code, and wherein the computer usable program code comprises:
computer usable code for detecting a contention condition in the use of a lock in a data processing system, the lock being used for managing read and write access to a resource in the data processing system;
computer usable code for determining a data structure used for implementing the lock;
computer usable code for, responsive to the data structure being a data structure of a reader writer lock (RWL), transitioning the data structure to a second data structure suitable for implementing the DML;
computer usable code for determining whether the DML has been expanded;
computer usable code for, responsive to the DML not having been expanded, expanding the DML such that the data structure includes an original lock and a set of expanded locks, the original lock and each expanded lock in the set of expanded locks forming an element of the DML;
computer usable code for receiving a request from a process in the data processing system to perform an operation using the DML;
computer usable code for determining whether to switch a mode of operation of the DML from a first mode to a second mode, the first mode of operation of the DML using the original lock of the DML, and the second mode of operation of the DML using the original lock and a subset of the expanded locks;
computer usable code for switching the mode of operation of the DML to the second mode responsive to a determination to switch to the second mode; and
computer usable code for assigning the process to one of the elements of the DML, the one of the elements forming an assigned element.

26. The data processing system of claim 25, further comprising:
computer usable code for setting an interlock indicator in the DML to a first value;
computer usable code for setting an expanded indicator in the DML to a second value corresponding to the expanded state of the DML; and computer usable code for setting an upgraded indicator in the DML to a third value indicating that the DML is using the set of expanded locks.

27. The data processing system of claim 25, wherein the process is a thread of a second process.

28. The data processing system of claim 25, further comprising:
computer usable code for determining, responsive to the request being for manipulating a read lock, whether the request is for acquiring the releasing the read lock; computer usable code for determining forming a second determination, responsive to the request being for releasing the read lock, one of (i) whether the assigned element is holding zero read locks, and (ii) whether the DML has been downgraded; computer usable code for reassigning the process to a second element in the DML responsive to the second determination being true.

29. The data processing system of claim 25, further comprising:
computer usable code for preparing to perform an acquisition of a read lock using the DML;
computer usable code for determining whether a read-mode indicator is set to a fourth value in an element of the DML;
computer usable code for setting an interlock indicator in the DML to a first value responsive to the read-mode indicator not being set to the third value;
computer usable code for setting the read-mode indicator to the fourth value after setting the interlock indicator to the first value; and
computer usable code for acquiring the read lock using one of the elements of the DML.

30. The data processing system of claim 29, further comprising:
computer usable code for resetting the interlock indicator.

31. The data processing system of claim 25, further comprising:
computer usable code for preparing to perform an release of a read lock using the DML;
computer usable code for determining whether a read-mode indicator is set to a fourth value in an element of the DML;
computer usable code for setting an interlock indicator in the DML to a first value responsive to the read-mode indicator not being set to the fourth value;
computer usable code for setting the read-mode indicator to the fourth value after setting the interlock indicator to the first value;
computer usable code for determining, forming a third determination, whether a lock count of the DML will reduce to zero if the read lock is released;
computer usable code for releasing the read lock using one of the elements of the DML; and
computer usable code for resetting the read-mode indicator, responsive to the third determination being true.

32. The data processing system of claim 31, further comprising:
computer usable code for downgrading the DML such that the DML operates in a first mode of operation, the first mode of operation of the DML using the original lock of the DML, and a second mode of operation of the DML using the original lock and a subset of the expanded locks.

* * * * *